Aug. 7, 1934.    E. GRIFFITHS ET AL    1,969,072
MEANS FOR MEASURING AND INDICATING TEMPERATURE FROM A DISTANCE
Filed Jan. 3, 1930    2 Sheets-Sheet 1

INVENTORS
E. GRIFFITHS
A. SNOW
BY
ATTORNEY

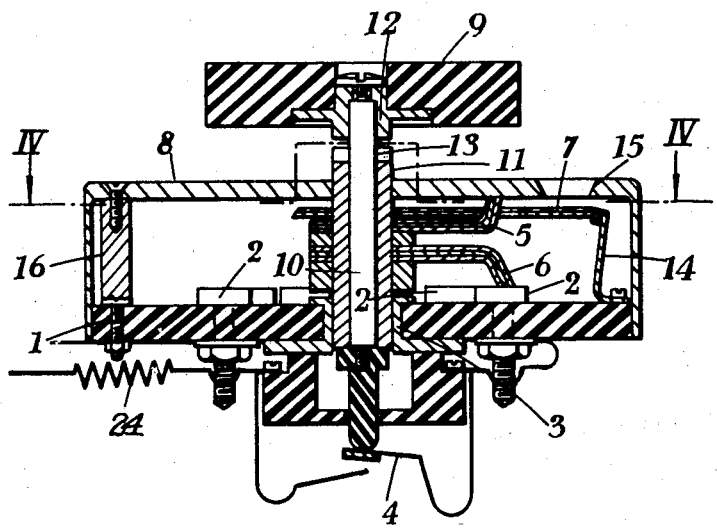
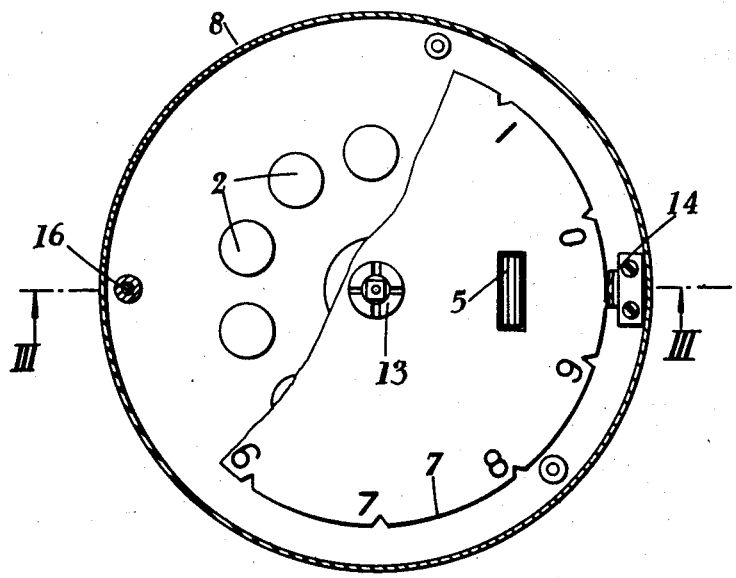

Patented Aug. 7, 1934

1,969,072

UNITED STATES PATENT OFFICE 1,969,072

MEANS FOR MEASURING AND INDICATING TEMPERATURE FROM A DISTANCE

Ezer Griffiths and Arthur Snow, Teddington, England

Application January 3, 1930, Serial No. 418,337
In Great Britain January 17, 1929

1 Claim. (Cl. 175—183)

This invention relates to a means for measuring and indicating temperature from a distance. It is primarily intended for use in taking readings of temperatures in various parts of a ship's hull, for example, in connection with the transportation of fruit where it is important that every comparatively small constituent part of the cargo should be maintained under observation.

In an arrangement which has previously been proposed, a number of thermal responsive electrical resistances are set up in various sections of the holds, positive and negative leads being brought to the improved apparatus. Assuming, for example, 100 thermal responsive resistances or thermometers are involved, there is provided in accordance with the invention a pair of switches each having ten contacts and a slider. The first set of contacts are connected to the negative poles of the thermometers in groups of ten corresponding to the tens digits; and the second group of contacts are connected to the positive poles of the thermometers in groups of ten corresponding to the units digits. Thus, a thermometer number 67 would be connected on the one hand to contact stud 6 of the first group, and on the other hand to contact stud 7 of the second group, and if the two sliders or pointers are connected to these studs respectively, it will be realized that only that thermometer which is numbered 67 will be in series with the circuit which includes the two sliders. By this means the apparatus provides a ready means of directly connecting any given thermometer in series with the testing circuit.

The testing apparatus comprises generally a Wheatstone's bridge arrangement, in which the ratio arms comprise equal resistances. The testing arms comprise on the one hand a thermometer comprising a thermal responsive resistance requiring to be tested, and on the other hand a series of rheostats in series with a resistance which is equal to the resistance of a thermometer at 0° F.

For determining temperatures to $\frac{1}{10}$th of a degree Fahrenheit, three rheostats will be provided arranged in series. The three rheostats are calibrated in tens, units and tenths of degrees respectively, and are of the type in which definite increments of resistance are added by rotating a slider over contact studs.

The rheostats according to the invention are combined with switches insulated from the rheostat variable resistance in such a manner that the rheostats cannot be put in circuit until the switch has made contact. The rheostats and resistances are normally in a test arm of the Wheatstone's bridge, but the switches are arranged in parallel across a break in a main battery lead so that any of the switches can be utilized to make the circuit. Preferably, at least two of the switches are arranged to put in circuit protective resistances.

The invention is illustrated in the accompanying drawings in which

Fig. 3 shows in cross-section on the line III—III of Fig. 4 a combined rheostat and contact switch.

Fig. 4 being a plan of Fig. 3 in section on the line IV—IV.

Figure 1:
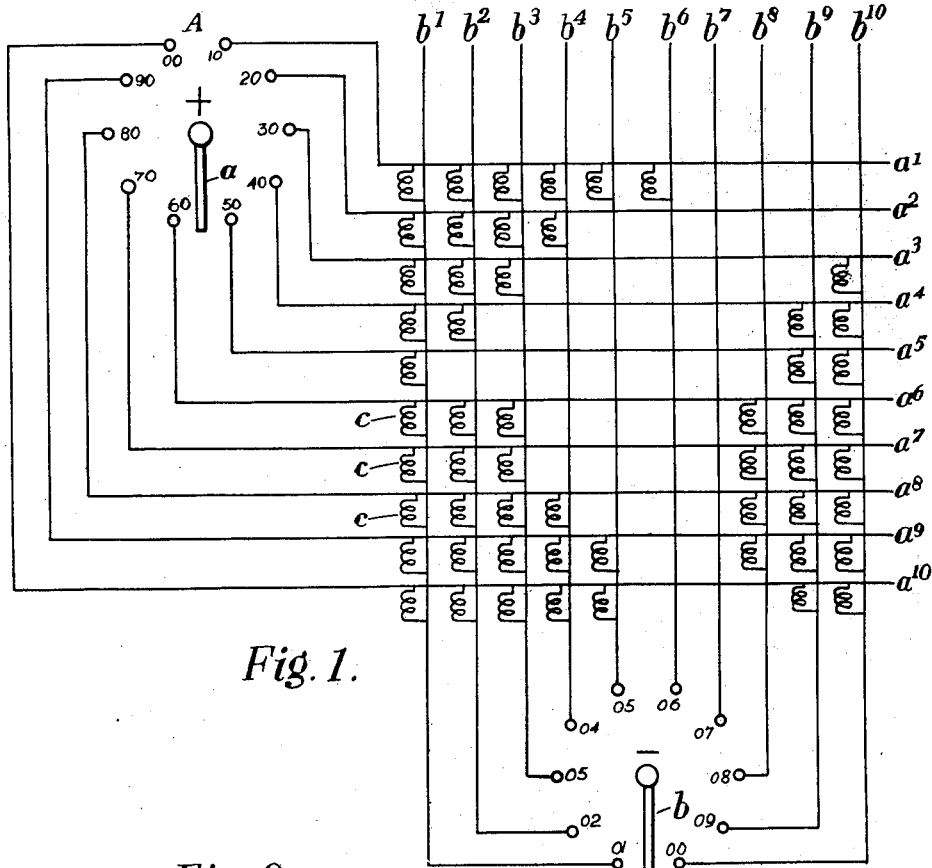
Fig. 1 shows a bank of testing thermometers connected to two selector switches.

Turning now to the arrangements illlustrated, Fig. 1 shows a pair of selector switches A, B, each having a slider $a$ or $b$ adapted to contact with one of ten studs in the usual manner. Each of the ten studs of the switch A is connected to one of a series of conductors arranged in parallel, $a^1, a^2 \ldots a^{10}$ and the studs of switch B are connected to a similar series of conductors $b^1, b^2 \ldots b^{10}$. The one hundred thermometers $c$ are connected across these conductors, one terminal of the thermometer being connected to a conductor of the $a$ series and the other to a conductor of the $b$ series so that no two thermometers are connected alike. If the studs of the switch A are understood to be numbered 00, 10, 20 etc., and those of switch B 00, 01, 02, 03 etc., it will be seen that the thermometer numbered 67 can be put in series with the sliders $a$, $b$ by connecting slider $a$ to the line $a^6$, and slider $b$ to the line $b^7$.

Figure 2:
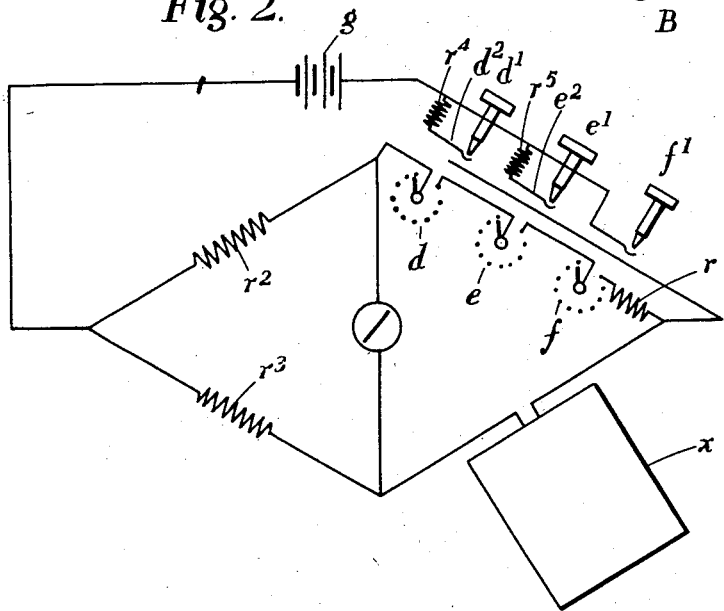
Fig. 2 shows a Wheatstone's bridge arrangement for testing any of the thermometers illustrated in Fig. 1.

For testing purposes a bank of thermometers and two switches are inserted at X in a testing arm of a Wheatstone's bridge as shown in Fig. 2. The other testing arm preferably includes three rheostats $d$, $e$, $f$ in series with each other and with the resistance $r$ corresponding to the resistance of a thermometer at 0 degrees Fahrenheit. The ratio arms include equal resistance $r^2$, $r^3$. The battery $g$ is connected to the Wheatstone's bridge through a lead which is broken, the break being adapted to be made by any of the three switches $d^1$, $e^1$, $f^1$ which in actual construction forms part of the instrument described below. Preferably the contacts $d^2$, $e^2$ operated by switches $d^1$, $e^1$ have ballast resistances $r^4$, $r^5$ in series therewith, $r^4$ being a higher resistance than $r^5$.

The combined instrument is illustrated in Figs. 3 and 4 and comprises four principal parts, the insulating base 1 carrying the contact studs 2, bearing 3 and battery switch 4; the rotating member consisting of brushes 5, 6, and indicator disc 7; the cover 8 by which connection with the rotating member is maintained, and the knurled operating handle 9 which also closes the battery switch 4 by means of an extension to its spindle 10.

The rotating member consists of a hollow conducting sleeve 11 carrying the indicator disc 7 and the two laminated metal brushes one brush bearing on the contact studs 2 and the other on the inside surface of the cover 8. The sleeve is free to slide in its bearing in the switch base so that the pressure on the rubbing surface of each brush is the same.

The spindle 10 slides inside the sleeve 11 and carries at its outer end the knurled operating knob 9 and half 12 of a dog clutch the other half 13 of which is formed in the projecting end of the sleeve 11. The length of the spindle is adjusted to ensure that the battery switch 4 is closed before the dog clutch engages, hence it is impossible to operate the rheostat unless the appropriate resistance is included in the battery circuit.

The indicator disc 7 has ten V notches cut in its periphery. One or more springs 14 mounted on the base bear against the periphery of the disc and carry on their rubbing faces suitably shaped projections which engage with the V notches. This arrangement forms a positioning device which enables the operator to avoid leaving the brush in contact with two adjacent studs. It also causes the numbers on the indicator disc to come to rest directly opposite the window 15 in the cover.

Contact studs numbered 0 to 9 are connected each to one end of a length of resistance wire, and the eight remaining studs are connected to intermediate points on the wire in such a manner that the resistance between any adjacent studs excepting 0 and 9 is $\frac{1}{10}$th the total resistance.

The cover 8 is connected to a terminal for connection in the circuit through the intermediary of a holding post 16, the other terminal being connected to the contact stud numbered 9.

The operation of the device is as follows:—
By setting the sliders $a$, $b$, any desired thermometer can be brought into the engagement of the Wheatstone's bridge. For testing purposes the switch $d^1$ is first depressed and the slider of rheostat $d$ set to produce a minimum deflection of the galvanometer needle. Owing to high resistance $r^4$ in series with the main lead, risk of injury to the galvanometer is avoided should the "out of balance" be a maximum at the time the switch is depressed. Switch $d^1$ is then released and switch $e^1$ operated, and the slider of rheostat $e$ rotated to give a minimum deflection of the galvanometer, it being understood that the calibration of the three rheostats $d$, $e$, $f$ is diminishingly proportioned, for example, the total resistance of rheostat $f$ equals the resistance between two studs of rheostat $e$ and the total resistance of rheostat $e$ the resistance of two studs of rheostat $d$. As all rheostats are in series, it will be seen that the resistance $r^5$ may be considerably less than resistance $r^4$ to provide adequate protection for the galvanometer. Switch $e^1$ is then released and switch $f^1$ and rheostat $f$ operated to bring the galvanometer needle finally back to zero.

It will be appreciated that by this means the test of the thermometer included in bank X may be effected with a high degree of accuracy, for example, to three places of decimals, and that current is cut off from the Wheatstone's bridge except at the moment the test is being actually made.

It will further be appreciated that the galvanometer is adequately protected against excess of current and that the whole apparatus combined with the selector switches for the bank of thermometers provides a highly convenient and efficient means of determining temperatures at a distance.

As it is essential that the operating handles be operated in the proper sequence, they may be inter-connected by any known or suitable means to prevent their operation except in the prescribed order.

It is to be understood that the above merely describes one preferred form of the invention, and that various details may be amended or substituted as desired. Obviously, the invention is not limited to use on ships, but covers generally the provision of means for selectively connecting one of a plurality of thermometers to a testing circuit, and the use of a plurality of rheostats in the arm of a Wheatstone's bridge substantially as and for the purpose described.

We claim:

In a Wheatstone's bridge arrangement, a series of variable resistances in series in a test arm of the bridge, a corresponding number of switches in parallel in a battery lead to the bridge, operating means associated with each of said switches to close its associated switch and then operate one of said variable resistances, and protective resistances of relatively different range each in series with one of said switches, each of said variable resistances being of different range relative to each other and in proportion to the range of the protective resistance with which it is associated through its switch, each of said operating means being held from operative effect on its variable resistance until actuated to close its associated switch and place its corresponding protective resistance in circuit.

EZER GRIFFITHS.
ARTHUR SNOW.